July 28, 1942. W. T. DUNN 2,291,151
CLUTCH
Filed July 28, 1939
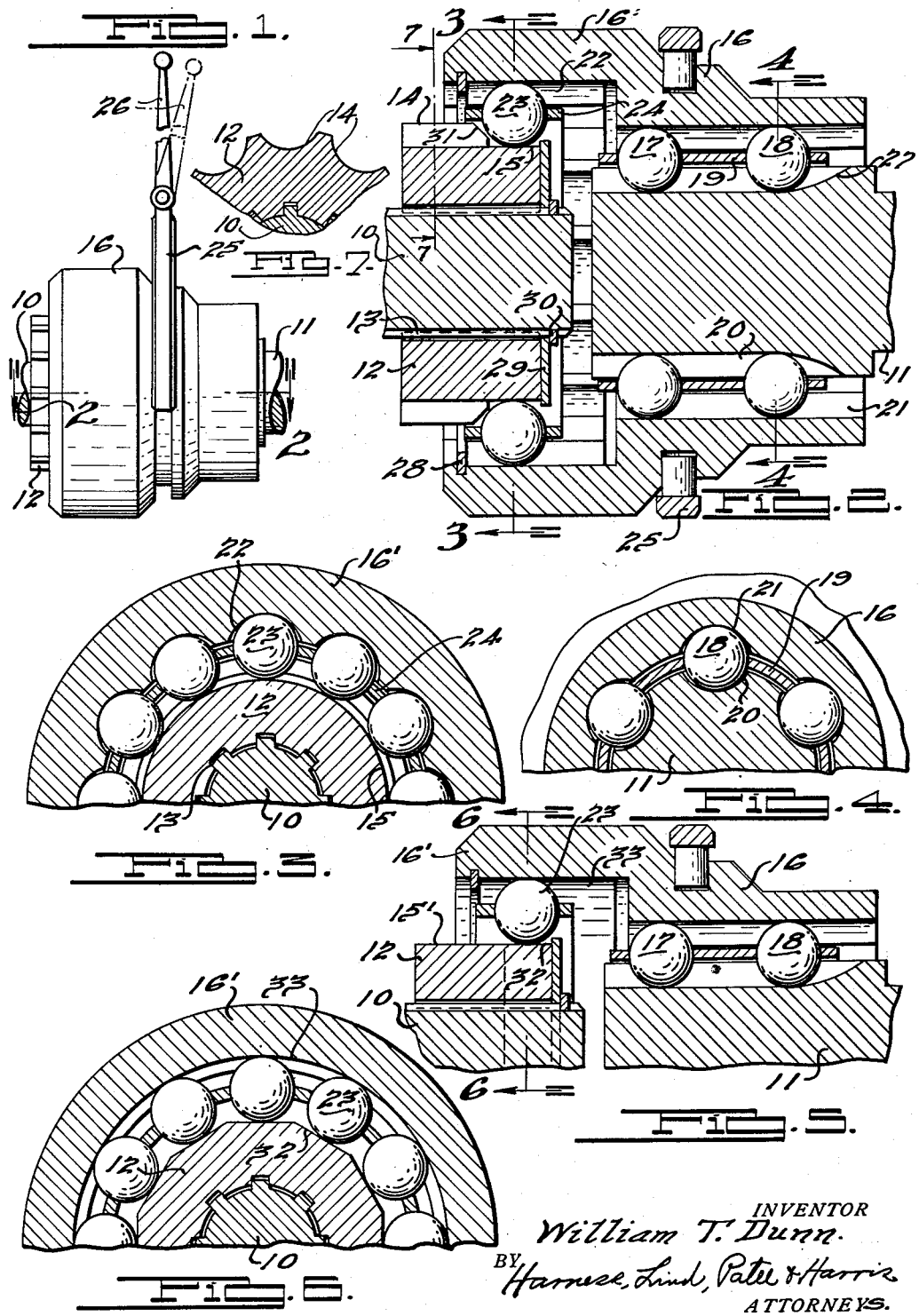
INVENTOR
William T. Dunn.
BY Harness, Lind, Patte & Harris
ATTORNEYS.

Patented July 28, 1942

2,291,151

UNITED STATES PATENT OFFICE 2,291,151

CLUTCH

William T. Dunn, Detroit, Mich., assignor to Chrysler Corporation, Highland Park, Mich., a corporation of Delaware Application July 28, 1939, Serial No. 286,987

8 Claims. (Cl. 192—38)

This invention relates to clutches and particularly to those types having engageable clutching elements that are disengageable while under load.

The principal object of the invention is to provide a clutch for releasably clutching together two relatively rotatable parts of a machine or the like, the clutching members thereof being releasable while running under load.

Other objects and advantages will readily become apparent to those skilled in the art as the description progresses.

For a description of two of the preferred forms of my invention reference is made to the accompanying drawing in which reference numerals are used to designate corresponding parts referred to in the following specification.

In the drawing:

Fig. 1 is a side elevation of my improved clutch.

Fig. 2 is an enlarged sectional view of the same.

Fig. 3 is a sectional view taken along line 3—3 of Fig. 2.

Fig. 4 is a sectional view taken along the line 4—4 of Fig. 2.

Fig. 5 is a part-sectional view of a modified form of my invention.

Fig. 6 is a sectional view along line 6—6 of Fig. 5, and

Fig. 7 is a sectional view along line 7—7 of Fig. 2.

Referring now to Figs. 1 to 4, inclusive, and Fig. 7, a typical arrangement of parts utilizing my improved clutch is illustrated. 10 designates a driving shaft and 11 a driven shaft. The driving shaft 10 has a male clutch member 12 suitably non-rotatably fastened thereon as by means of splines 13. The member 12 is provided on a portion of its outer periphery with a plurality of spline-like projections 14, the flanks thereof being shaped to form substantially semi-cylindrical grooves between adjacent pairs of splines as shown in Fig. 7. These splines are discontinued some distance from one end of the member 12, as indicated at 15, this portion of the clutch member being of true cylindrical form.

A female clutch member or sleeve 16 is slidably carried on the driven shaft 11 and drivingly connected thereto by means of balls 17 and 18. The latter have a common carrier 19 free to move with the balls and each pair of longitudinally aligned balls is received within a pair of substantially semi-cylindrically shaped radially juxtapositioned grooves or splines 20 and 21 formed in the shaft 11 and the clutch member 16 respectively, as illustrated in Figs. 2 and 4.

The clutch member 16 is also provided with an outwardly stepped portion 16' which has a set of splines or grooves 22 of substantially semi-cylindrical shape formed therein. The splines 22 are adapted to receive the balls 23 which are maintained in correctly spaced relation by the carrier 24, the latter being movable independently of the members 12 and 16.

In Fig. 2 the clutch is shown in disengaged position, the driving shaft 10 under such conditions being free to rotate relative to the shaft 11 and clutch member 16, the balls 23 partaking of a combined rolling and sliding motion relative to the cylindrical surface 15 and the surfaces 22 of the splines. When the clutch is in engaged position, the balls 23 engage both the spline grooves 22 and the spline grooves 14, it being apparent that under such conditions, a drive connection between members 10 and 11 is established, the balls 23 being pinched or wedged between respectively opposite sides of the grooves.

The clutch member 16 is adapted to be moved into engaged or driving position by means of the fork 25 which is movable by the shift lever 26 as indicated. Movement of the member 16 toward the left of Fig. 2 under conditions when the shafts 10 and 11 are rotating substantially in synchronism, or when they are stationary, will cause the balls 23 to be rolled into the spline grooves 14 thereby establishing a positive clutching relation between the clutch members 12 and 16 through the intermediary of the balls 23 and the spline grooves 14 and 22.

Disengagement of the member 16 from drive relation with respect to the member 12 may be made at any time, even under full driving torque simply by moving the member 16 toward the right of Fig. 2, the balls 17, 18 and 23 rolling in the grooves until the balls 23 have been moved out of the grooves 14.

The spline grooves 14, 20, 21 and 22 are preferably cylindrical in form, but of a radius slightly larger than the radius of the balls to be received therein in order that the parts may fit tightly together yet permit easy rolling of the balls longitudinally of the grooves without undue resistance due to friction.

In order to minimize possibility of sliding between the balls 17, 18 and the surfaces of the grooves 20 and 21, the member 16 may be heated before it is assembled with the shaft 11 and the balls 17, 18. Subsequent cooling will then cause the member 16 to "shrink" and a tight, rolling fit will be assured, the balls being placed under compression. The same treatment may be accorded the member 12 to assure a tight, rolling fit between the grooves 14, 22 and the balls 23, but because of the fact that some sliding action is necessary between balls 23 and the members 10 and 16 when the clutch is in disengaged position, an extremely tight fit is not desired. In some cases it might even be desirable to slightly taper the surface 15 toward the inner end of the shaft by grinding in order to minimize friction during sliding action when the clutch is disengaged. In any case, the balls 23 are loaded sufficiently so that under normal conditions no sliding will take place during longitudinal movement of the clutch sleeve 16, pure rolling action being desired in order that ease of shifting is enhanced.

Under ordinary conditions the clutch member 16 will be retained in engaged or disengaged position because of the frictional load on the balls due to driving torque, but if desired, some form of detent means such as is usually provided in conjunction with shiftable power transmission members may be provided.

In shifting the member 16 from engaged to disengaged position, and vice-versa, the ball centers will, of course, travel longitudinally of the assembly only one half of the distance traversed by the movable clutch member; thus a compact unit is made possible. Movement of the member 16 toward the right of Fig. 2 is limited by the outwardly curved termini 27 of the splines 26, but in case there should be some sliding between the member 16 and the balls 17, 18 due to wear, a snap ring 28 is provided to retain the parts in correctly assembled relation. A ball retaining ring 29 secured to the inner end of the shaft 10 by a snap ring 30 also assists in retaining the parts in correct relationship. The snap rings 28 and 29 are adapted to engage the balls 23 thereby preventing separation of the parts should slippage occur therebetween.

Movement of the member 16 toward the left of Fig. 2 is limited by engagement of the radially innermost portion of member 16 with the ring 29.

In order to facilitate quiet engagement and disengagement of the balls 23 with the splines 14, the ends 31 of the spline teeth may be beveled or rounded off if desired.

Figs. 5 and 6 illustrate a modification of the invention wherein a polygonally-shaped cam 32 is formed on the outer surface of the male clutch member 12 instead of splines or grooves. The cam 32 comprises a plurality of preferably flat surfaces each of which is adapted to engage one of the balls 23. The inner surface of the portion 16' of the female clutch member is cylindrical, as indicated at 33, instead of splined as in Fig. 2.

In Figs. 5 and 6 the clutch is shown in engaged position. Upon driving torque being imposed upon shaft 10 the rollers 23 will be pinched between the surface 33 and the high positions of the cam surfaces 32 and drive will be transmitted from member 12 to member 16 and thence to shaft 11 through the balls 17, 18. Under such conditions the drive between shafts 10 and 11 may be released by sliding the member 16 toward the left of Fig. 5 which action will roll the balls 23 out of contact with the cam 32 and into contact with the cylindrical surface 15'. When thus disengaged the balls 23 have pure rolling movement with respect to both the surface 15' and the surface 33 which are both cylindrical. The Fig. 5 clutch is in other respects like that of Fig. 2 and to avoid repetition a full description will not be repeated.

In either of the above described forms of clutches, one set of the spline balls 17, 18 may be omitted without seriously affecting the operation of the clutch. It is, however, preferred to provide two sets in order to lessen the likelihood of misalignment between the clutch splines 14 and 22.

But two of the many embodiments of which the invention is capable have been illustrated, and it is obvious that various changes in the size and shape of the parts as well as in the positions of the clutching and non-clutching portions will suggest themselves to those skilled in the art. It is therefore not intended to limit the scope of the invention in its broader aspects except as set forth in the claims appended hereto.

Having thus described my invention, that which I claim as new and desire to secure by Letters Patent is:

1. In combination, rotatable co-acting power transmitting members having means for positively engaging with one another; said means comprising an axially disposed groove formed in each of said members, a ball engaging said grooves; and means for moving one of said members relative to the other to thereby roll said ball out of engagement with at least one of said grooves whereby relative rotation between the members is permitted.

2. In combination, rotatable co-acting power transmitting members disposed in telescoping relationship and having releasable means for positively engaging with one another; said means comprising an axial groove formed in one of said members, a ball disposed in said groove, an axial groove formed in the other of said members adapted to engage said ball, and means for rolling said ball into and out of said last mentioned groove, said last mentioned groove being beveled at its ends to facilitate entrance of said ball therein.

3. In combination, rotatable co-acting power transmitting members having axially extending radially juxtapositioned cylindrical surfaces, releasable means for drivingly engaging said members comprising a ball disposed in rolling contact with said surfaces, a cam formed on one of said members adjacent the cylindrical surface thereof, said cam being of such configuration that it is adapted to wedge said ball between itself and the cylindrical surface of said other member upon rotation of one of said members, and means for shifting one of said members relatively to the other whereby said ball is rolled into contact with said cam.

4. In combination, a pair of coaxially disposed power transmitting members; means for releasably connecting said members in driving relation comprising a coupling sleeve slidable with respect to said members, said sleeve and said respective members having pairs of radially juxtapositioned axially disposed grooves, and at least one of said members having a cylindrical portion disposed adjacent the grooved portion thereof, a ball disposed in each of said pairs of grooves, and means for sliding said coupling sleeve in one direction relative to said members thereby to roll the ball disposed in the groove adjacent said cylindrical portion out of said groove into contact with said cylindrical portion and in the opposite direction to roll said ball into said groove.

5. In combination, a pair of coaxially disposed power transmitting members; means for releasably connecting said members in driving relation comprising a coupling sleeve slidable with respect to said members, one of said members and said sleeve having a pair of radially juxtapositioned axially disposed grooves, a ball disposed in said grooves and drivingly connecting said members; the other of said members and said sleeve having radially juxtapositioned cylindrical surfaces; a cam surface disposed axially adjacent one of said cylindrical surfaces; a ball disposed between the said other member and said sleeve and adapted to be rolled into contact with either said cam surface or said adjacent cylindrical surface by sliding movement of said sleeve.

6. In a clutch for releasably connecting a pair of power transmitting members, a sleeve carried by one of said members; radially juxtapositioned axial grooves in said sleeve and said one member; a plurality of balls disposed in each pair of complementary grooves, said balls forming the driving connection between said sleeve and member; radially juxtapositioned axial grooves in said sleeve and said other member, one of the said latter elements having a cylindrical surface portion disposed adjacent the grooves thereof; a plurality of balls disposed between said sleeve and said other member, and means for sliding said sleeve axially thereof to roll said last mentioned balls into and out of the grooves in the member having the adjacent cylindrical portion.

7. In a clutch for releasably connecting a pair of power transmitting members, a sleeve carried by one of said members; radially juxtapositioned axial grooves in said sleeve and said one member; a plurality of balls disposed in each pair of complementary grooves, said balls forming the driving connection between said sleeve and member; radially juxtapositioned cylindrical surface portions in said sleeve and said other member; a cam surface portion disposed adjacent one of said cylindrical surfaces in the same member; a plurality of balls disposed between said sleeve and said last other member, and means for sliding said sleeve axially thereof to roll said last mentioned balls into and out of contact with said cam surface portion.

8. In combination with a pair of coaxially arranged shafts, means for establishing a releasable drive connection between said shafts comprising a sleeve disposed in telescopic relation with said shafts, said sleeve and one of said shafts having radially juxtapositioned axially extending grooves provided therein, balls disposed in said grooves thereby to form a driving connection between the sleeve and said one shaft while permitting substantially free rolling of the balls axially of the grooves in response to axial shifting of the sleeve, the sleeve and said other shaft having balls disposed therebetween in contact therewith and one of the parts having axially adjacent wedging and non-wedging surface portions whereby said last named balls are adapted to establish a driving connection between the parts when in contact with the wedging surface portions, said balls being free for axial rolling in response to axial shifting of the sleeve.

WILLIAM T. DUNN.